(12) United States Patent
Takeda et al.

(10) Patent No.: US 7,393,570 B2
(45) Date of Patent: Jul. 1, 2008

(54) BROAD-BAND-CHOLESTERIC LIQUID-CRYSTAL FILM, PROCESS FOR PRODUCING THE SAME, CIRCULARLY POLARIZING PLATE, LINEARLY POLARIZING ELEMENT, ILLIMINATOR, AND LIQUID-CRYSTAL DISPLAY

(75) Inventors: Kentarou Takeda, Ibaraki (JP); Kazutaka Hara, Ibaraki (JP); Naoki Takahashi, Ibaraki (JP); Takahiro Fukuoka, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/542,017

(22) PCT Filed: Jan. 8, 2004

(86) PCT No.: PCT/JP2004/000062

§ 371 (c)(1),
(2), (4) Date: Jul. 11, 2005

(87) PCT Pub. No.: WO2004/063779

PCT Pub. Date: Jul. 29, 2004

(65) Prior Publication Data

US 2006/0127605 A1 Jun. 15, 2006

(30) Foreign Application Priority Data

Jan. 10, 2003 (JP) .............................. 2003-004550

(51) Int. Cl.
*C09K 19/52* (2006.01)
*F21V 7/22* (2006.01)
*F21V 9/14* (2006.01)
*G02F 1/13363* (2006.01)

(52) U.S. Cl. .................. 428/1.3; 252/585; 252/299.01; 349/115; 349/176

(58) Field of Classification Search .................. 428/1.1, 428/1.3; 252/585, 299.01; 349/96, 98, 113, 349/115, 176, 194, 118
See application file for complete search history.

(56) References Cited

U.S. PATENT DOCUMENTS 5,430,566 A * 7/1995 Sakaya et al. ............... 349/118

(Continued)

FOREIGN PATENT DOCUMENTS

EP 0 606 940 B1 4/1999

(Continued)

OTHER PUBLICATIONS

Abstract of JP 2000-347006, Yano, Dec. 2000.*

(Continued)

*Primary Examiner*—Terrel Morris
*Assistant Examiner*—Sow-Fun Hon
(74) *Attorney, Agent, or Firm*—Westerman, Hattori, Daniels & Adrian, LLP.

(57) ABSTRACT

A broad band cholesteric liquid crystal film of the present invention is a cholesteric liquid crystal film obtained by coating a liquid crystal mixture containing a polymerizable mesogen compound (a), a polymerizable chiral agent (b) and a photoisomerizable material (c) on a substrate to ultraviolet polymerize a coat of the liquid crystal mixture, and has a reflection bandwidth of 200 nm or more. A broad band cholesteric liquid crystal film of the present invention has a broad reflection band, is of a thin type and can be manufactured in less of manufacturing steps.

24 Claims, 3 Drawing Sheets

U.S. PATENT DOCUMENTS

| | | | |
|---|---|---|---|
| 5,506,704 A | | 4/1996 | Broer et al. |
| 5,518,783 A | * | 5/1996 | Kawata et al. .............. 428/1.1 |
| 5,691,789 A | | 11/1997 | Li et al. |
| 5,731,886 A | * | 3/1998 | Taber et al. ................. 359/291 |
| 5,798,057 A | * | 8/1998 | Hikmet ..................... 252/299.5 |
| 6,088,077 A | * | 7/2000 | De Wit et al. ............... 349/117 |
| 6,088,079 A | | 7/2000 | Kameyama et al. ......... 349/185 |
| 6,099,758 A | | 8/2000 | Verrall et al. |
| 6,175,400 B1 | * | 1/2001 | Duncan et al. .............. 349/117 |
| 6,319,963 B1 | * | 11/2001 | Coates et al. ................... 522/1 |
| 6,515,785 B1 | * | 2/2003 | Cobb et al. ................. 359/247 |
| 6,573,963 B2 | * | 6/2003 | Ouderkirk et al. ........... 349/117 |
| 6,849,203 B2 | * | 2/2005 | Farrand et al. ......... 252/299.01 |
| 6,961,106 B2 | * | 11/2005 | Kashima ..................... 349/117 |
| 7,122,227 B2 | | 10/2006 | Vaughan-Spickers et al. |
| 2003/0072893 A1 | | 4/2003 | Nakano et al. |
| 2004/0026660 A1 | | 2/2004 | Vaughan-Spickers et al. |

FOREIGN PATENT DOCUMENTS

| | | |
|---|---|---|
| JP | 6-281814 | 10/1994 |
| JP | 2561483 | 9/1996 |
| JP | 9-189811 | 7/1997 |
| JP | 10-321025 | 12/1998 |
| JP | EP 0881 509 A2 * | 12/1998 |
| JP | 11-248943 | 9/1999 |
| JP | 11-512849 | 11/1999 |
| JP | 2000321408 A | 11/2000 |
| JP | 3272668 | 1/2002 |
| JP | 2002-308832 | 10/2002 |
| JP | 2002-338575 | 11/2002 |
| JP | 2003-262732 | 9/2003 |
| JP | 2004-523485 A | 8/2004 |
| WO | WO 98/38547 | 9/1998 |
| WO | WO 02/40614 A1 | 5/2002 |

OTHER PUBLICATIONS

Abstract of JP 06-082777, Sakatani et al, Mar. 1994.*

Japanese Office Action dated May 8, 2007 (mailing date), issued in corresponding Japanese Patent Application No. 2004-002135.

* cited by examiner

BROAD-BAND-CHOLESTERIC LIQUID-CRYSTAL FILM, PROCESS FOR PRODUCING THE SAME, CIRCULARLY POLARIZING PLATE, LINEARLY POLARIZING ELEMENT, ILLIMINATOR, AND LIQUID-CRYSTAL DISPLAY

TECHNICAL FIELD

The present invention relates to a broad band cholesteric liquid crystal film and a manufacturing method therefor. A broad band cholesteric liquid crystal film of the present invention is useful as a circularly polarizing plate (a reflection polarizer). The present invention relates to a linearly polarizer, a luminaire and a liquid crystal display using the circularly polarizing plate. Moreover, the present invention relates to a polarizing element system using the circularly polarizing plate and a wide viewing angle magnification liquid crystal display using the polarizing element system.

BACKGROUND ART

Generally, a liquid crystal display has a structure in which a space between glass plates forming transparent electrodes is filled with a liquid crystal and polarizers are arranged before and after the glass plates. A polarizer used in such a liquid crystal display is manufactured in a procedure in which iodine or a dichloic dye is subjected to be adsorbed to a polyvinyl alcohol film and the film is stretched in a given direction. The polarizer thus manufactured itself absorbs light vibrating in one direction and transmits only light vibrating in the other direction therethrough to thereby produce linearly polarizing light. Therefore, an efficiency of the polarizer could not exceed 50% theoretically, which works as the greatest factor to reduce an efficiency of a liquid crystal display. As the matters worse about the absorbed light, if a liquid crystal display is operated with an increased output of a light source beyond a level, it results in inconveniences that a polarizer is broken down by heat generation due to thermal conversion of absorbed light or that a display quality is degraded under thermal influence onto liquid crystal layer in a cell.

A cholesteric liquid crystal having a circularly polarized light separating function has a selective reflection characteristic reflecting only circularly polarized light having a direction thereof coinciding with a helical rotation direction of the liquid crystal and a wavelength equal to a helical pitch length of the liquid crystal. With this selective reflection characteristic used, only a specific circularly polarizing light of natural light in a given wavelength band is transmission-separated and the other light components are reflected and recycled, thereby enabling a polarizing film with a high efficiency to be manufactured. In the context, transmitted circularly polarized light passes through a $\lambda/4$ plate and thereby converted to linearly polarizing light, and coincidence of a direction of the linearly polarized light with a transmission direction of an absorption polarizer used in a liquid crystal display enables a liquid crystal display with a high transmittance to be realized. That is, in a case where a cholesteric liquid crystal film is combined with a $\lambda/4$ plate and the combination is used as a linearly polarizer, the linearly polarizer could achieve a brightness twice as that of a conventional absorption polarizer singly used, which absorbs 50% of incident light, due to no light loss theoretically.

There has been, however, difficulty in covering all the range of visible light, since a selective reflection characteristic of a cholesteric liquid crystal is restricted to only a specific wavelength band. A selective reflection wavelength bandwidth $\Delta\lambda$ is expressed by following formula:

$$\Delta\lambda=2\lambda\cdot(n_e-n_o)/(n_e+n_o)$$

where $n_o$: ordinary light refractive index of a cholesteric liquid crystal molecule, $n_e$: extraordinary light refractive index of the cholesteric liquid crystal molecule, and $\lambda$: central wavelength in selective reflection.

The selective reflection wavelength bandwidth $\Delta\lambda$ depends on a molecular structure of the cholesteric liquid crystal itself. According to the above formula, if $(n_e-n_o)$ is larger, a selective reflection wavelength bandwidth $\Delta\lambda$ can be broader, while $(n_e-n_o)$ is usually 0.3 or less. With this value being larger, other functions as a liquid crystal (such as alignment characteristic, a liquid crystal temperature or the like) becomes insufficient, causing its practical use to be difficult. Therefore, a selective reflection wavelength bandwidth $\Delta\lambda$ has been actually on the order of 150 nm at highest. A cholesteric liquid crystal available in practical aspect has had a selective reflection wavelength bandwidth $\Delta\lambda$ only of the order in the range of 30 to 100 nm in many cases.

A selective reflection central wavelength $\lambda$ is given by the following formula:

$$\lambda=(n_e-n_o)P/2$$

where P: helical pitch length required for one helical turn of cholesteric liquid crystal.

With a given pitch length, a selective reflection central wavelength $\lambda$ depends on an average refractive index and a pitch length of a liquid crystal molecule.

Therefore, in order to cover all the range of visible light, there have been adopted methods, in one of which plural layers having respective different selective reflection central wavelengths are laminated, and in another of which a pitch length is continuously changed in the thickness direction to thereby form a positional distribution of selective reflection central wavelengths.

For example, there can be exemplified a method in which a pitch length is continuously changed in the thickness direction (for example, see a publication of JP-A No. 6-281814, a specification of JP No. 3272668 and a publication of JP-A No. 11-248943). This method is such that when a cholesteric liquid crystal composition is ultraviolet exposure-cured, exposure intensities on sides of exposure and light emission are differentiated therebetween to alter a polymerization speed therebetween, which provides a change in compositional ratio of a liquid crystal composition having a different reaction speed in the thickness direction.

The bottom line of this method lies in that exposure intensities on sides of exposure and light emission are greatly different therebetween. Therefore, in many of the examples of the prior art described above, there has been adopted a method in which an ultraviolet absorbent is mixed into a liquid crystal composition so as to cause absorption thereof in the thickness direction to thereby amplify a difference in exposure dosage according to an optical path length.

In a method disclosed in a publication of JP-A No. 6-281814, in which a pitch length is continuously altered, necessities arise for a liquid crystal thickness required for revealing the function to be on the order in the range of from 15 to 20 μm, and for more of an expensive liquid crystal in amount in addition to a problem of precise coating of a liquid crystal layer, which disables cost-up to be avoided. Moreover, an exposure time is necessary to be on the order in the range of from 1 to 60 min, which leads to a need for a long manufacturing line with an exposure line length in the range of from 10 to 600 m in order to obtain a line speed of 10 m/min. With a reduced line speed adopted, a line length can be reduced, while a lower manufacturing speed cannot be avoided.

This is because, as described in the publication of JP-A No. 6-281814, a quick change in pitch is difficult to be realized due to a theoretical issue in controlling a cholesteric pitch caused by a difference in ultraviolet exposure intensity in the thickness direction for a change in pitch length in the thickness direction and by a change in compositional ratio due to material transfer caused by a difference in polymerization speed accompanying the difference in ultraviolet intensity. Since, in the publication of JP-A No. 6-281814, pitch lengths in the short pitch side and the long pitch side are different therebetween by as large as on the order of 100 nm, a compositional ratio is necessary to change to a great extent and in order to realize it, a further necessity arises for a considerable thickness of liquid crystal, a very weak ultraviolet illumination and a long exposure time.

Since in a method disclosed in a publication of JP-A No. 11-248943, transfer of a material changing a pitch is better than an example material used in the publication of JP-A No. 6-281814, an exposure dosage of the order of 1 min enables a film to be formed. In this case as well, a necessary thickness is 15 μm, however.

While, in a specification of JP No. 3272668, a temperature condition in a first exposure is altered from that in a second exposure and a time necessary for a change in compositional ratio in the thickness direction is separately provided in a dark place, a wait time for material transfer due to a change in temperature is necessary to be in the range of from 10 to 30 min.

A liquid crystal coat thickness, even in the specification of JP No. 3272668 and the publication of JP-A No. 11-248943, is about 15 μm and in comparison of the specification and the publication described above with the publication of JP-A No. 6-281814 in which the liquid crystal coat thickness is required to be about 20 μm, it is understand that a necessity arises for a larger cholesteric liquid crystal thickness and a longer time for material transfer in order to cover all the range of visible light with a change in pitch caused by a change in compositional ratio in the thickness direction of one liquid crystal layer.

In a publication of JP-A No. 9-189811, at least three layers are necessary in order to cover all the range of visible light, and a long wavelength side is covered for betterment of a viewing angle characteristic, and the number of necessary laminated layers increases to as large as 4 to 5 in a case where a measure is taken against oblique incident light, which leads to more complexity in manufacture steps and increase in the number of steps, thereby unavoidably resulting in reduction in production yield.

With combination of such a broad band circularly polarizing plate with a retardation plate, a diffuse light source is enabled to emit collimated light. Adoption of such a collimated light source and a diffuse plate enables a construction of a viewing angle magnification system in a liquid crystal display.

For example, as shown in a specification of JP No. 2561483 and a publication of JP-No. 10-321025, by inserting a retardation plate controlled in a way such that a retardation value in a vertical direction of incidence and a retardation value in an oblique direction of incidence are specifically different from each other between polarizers, an angular distribution of transmitted light receives a restraint and in this case, if an absorption polarizer is used, light only in the vicinity of the front face is transmitted, while peripheral light are all absorbed. By using a circularly polarizing plate (a reflection polarizer), light only in the vicinity of the front face is transmitted while peripheral light is all reflected. If such an effect is adopted, emission light of a backlight can be condensed and collimated without being accompanied by absorption loss.

With combination of such a collimated backlight source and a diffuse plate less of backscattering and occurring no polarization cancellation, a viewing angle magnification system can be constructed. As described above, in a conventional method in which multiple liquid crystal layers are laminated, however, (the publication of JP-A No. 9-189811), there has arisen a problem of increased number of steps due to lamination of multiple layers, while in a method as disclosed in the publication of JP-A No. 6-281814 or the specification of JP No. 3272668 in which a liquid crystal layer is thick, there has occurred a problem of cost-up.

DISCLOSURE OF THE INVENTION

It is an object of the present invention to provide a broad band cholesteric liquid crystal film having a wide reflection band, of a thin type, and capable of manufacturing itself with a less number of manufacturing steps and a manufacturing method therefor.

It is another object of the present invention to provide a circularly polarizing plate using the broad band cholesteric liquid crystal film, and furthermore, to provide a linearly polarizer, a luminaire and a liquid crystal display using the circularly polarizing plate.

It is still another object of the present invention to provide a polarizing element system using the circularly polarizing plate and to provide a wide viewing angle magnification liquid crystal display using the polarizing element system.

The present inventors have conducted serious studies in order to solve the problems with resultant findings that the objects can be achieved with the following broad band cholesteric liquid crystal film and a manufacturing method therefor, leading to completion of the present invention. That is, the present invention is as follows:

1. A broad band cholesteric liquid crystal film comprising: a cholesteric liquid crystal film obtained by coating a liquid crystal mixture containing a polymerizable mesogen compound (a), a polymerizable chiral agent (b) and a photoisomerizable material (c) on a substrate to ultraviolet polymerize thereof, having a reflection bandwidth of 200 nm or more.

2 The broad band cholesteric liquid crystal film according to above-mentioned 1, wherein a pitch length in the cholesteric liquid crystal film changes continuously.

3. The broad band cholesteric liquid crystal film according to above-mentioned 1. or 2., wherein the liquid crystal mixture comprising a photopolymerization initiator (d).

4. The broad band cholesteric liquid crystal film according to any one of above-mentioned 1. to 3., wherein the polymerizable mesogen compound (a) has one, or two or more of polymerizable functional groups, the polymerizable chiral agent (b) has one, or two or more polymerizable functional groups.

5. The broad band cholesteric liquid crystal film according to any one of above-mentioned 1. to 4., wherein the photoisomerizable material (c) is at least one kind selected from the group consisting of stilbene, azobenzene and a derivative thereof.

6. A manufacturing method for the broad band cholesteric liquid crystal film according to any one of above-mentioned 1. to 5. comprising steps of: coating a liquid crystal mixture containing a polymerizable mesogen compound (a), a polymerizable chiral agent (b) and a photoisomerizable material (c) on a substrate and ultraviolet polymerizing thereof.

7. A circularly polarizing plate comprising the broad band cholesteric liquid crystal film according to any one of above-mentioned 1. to 5.

8. A linearly polarizer comprising the circularly polarizing plate according to above-mentioned 7. and a λ/4 plate laminating on the circularly polarizing plate.

9. The linearly polarizer according to above-mentioned 8., the circularly polarizing plate, which is the cholesteric liquid crystal film, is laminating on the λ/4 plate so that a pitch length in the film is narrowed toward the λ/4 plate continuously.

10. A linearly polarizer comprising an absorption polarizer adhering to the linearly polarizer according to above-mentioned 8. or 9. so that a transmission axis direction of the absorption polarizer and a transmission axis of the linearly polarizer are arranged in parallel with each other.

11. A luminaire comprising the circularly polarizing plate according to above-mentioned 7. or the linearly polarizer according to any one of above-mentioned of 8. to 10. on a front surface side of a surface light source having a reflective layer on the back surface side thereof.

12. A liquid crystal display comprising a liquid crystal cell in a light emitting side of the luminaire according to above-mentioned 11.

13. A polarizing element system comprising: a retardation layer (b) having a front face retardation (in the normal direction) of almost zero and a retardation of λ/8 or more relative to incident light incoming at an angle of 30° or more inclined from the normal direction is arranged between at least two layers of a reflection polarizer (a) having respective selective reflection wavelength bands of polarized light superimposed on each other, wherein the reflection polarizer (a) is the circularly polarizing plate according to above-mentioned 7.

14. The polarizing element system according to above-mentioned 13., wherein a selective reflection wavelength of the at least two layers of the reflection polarizer (a) is superimposed on each other in the wavelength range 550 nm±10 nm.

15. The polarizing element system according to above-mentioned 13. or 14., wherein the retardation layer (b) is a layer comprising a cholesteric liquid crystal phase having a selective reflection wavelength band other than the visible light region fixed in planar alignment.

16. The polarizing element system according to above-mentioned 13. or 14., wherein the retardation layer (b) is a layer comprising a rod-like liquid crystal fixed in homeotropic alignment state.

17. The polarizing element system according to above-mentioned 13. or 14., wherein the retardation layer (b) is a layer comprising a discotic liquid crystal fixed in nematic phase or columnar phase alignment state.

18. The polarizing element system according to above-mentioned 13. or 14., wherein the retardation layer (b) is a layer comprising a biaxially orienting polymer film.

19. The polarizing element system according to above-mentioned 13. or 14., wherein the retardation layer (b) is a layer comprising an inorganic layered compound with negative uniaxiality fixed in alignment state where an optical axis thereof is a normal direction of a surface thereof.

20. A wide viewing angle liquid crystal display comprising at least:

a backlight system containing a polarizing element system according to any one of above-mentioned 13. to 19. to collimate a light from a diffuse light source;

a liquid cell transmitting collimated light;

a polarizing plate arranged on both sides of the liquid cell; and a viewing angle magnification film, which diffusing transmitted light, arranged on a viewer side of the liquid cell.

21. The wide viewing angle liquid crystal display according to above-mentioned 20., wherein a λ/4 plate is arranged on the viewer side (the liquid cell side) of the polarizing element system according to any one of above-mentioned 13 to 19 so that an axial direction of linearly polarized light transmitted and a transmission axis direction of a polarizing plate on the lower side (the light source side) of the liquid crystal display are arranged in parallel with each other.

22. The wide viewing angle liquid crystal display according to above-mentioned 20. or 21., wherein the viewing angle magnification film is a diffuse plate substantially having neither backscattering nor polarization cancellation.

23. The wide viewing angle liquid crystal display according to any one of above-mentioned 20. to 22., wherein an each layer is laminated with a translucent adhesive or a pressure sensitive adhesive.

Action

A broad band cholesteric liquid crystal film of the present invention described above is obtained by ultraviolet polymerizing a polymerizable liquid crystal mixture and the liquid crystal mixture contains a photoisomerizable material (c). With such a photoisomerizable material (c) adopted, it is realized to reduce an ultraviolet illumination time and form a film with a thin coat thickness.

It was reported that the photoisomerizable materials (c) such as azobenze can reversibly control selective reflection band of a cholesteric liquid crystal in a photoisomerization reaction, which was described in Japanese Liquid Crystal Society symposium papers, pp. 66 to 69 (1999). For example, a photoisomerization reaction occurs in a way such that by illuminating azobenzene with ultraviolet of a wavelength in the vicinity of 365 nm, a trans-isomer is converted to a cis-isomer, while by illuminating it with visible light of a wavelength in the vicinity of 440 nm or heating, a cis-isomer is converted to a trans-isomer. That is, it has been reported that when a substrate on which a liquid crystal mixture containing a photoisomerizable material (c) is coated is illuminated with ultraviolet, a reflection band of a cholesteric liquid crystal shifts.

If such a photoisomerizable material (c) is added to a liquid crystal mixture and the mixture is illuminated with ultraviolet so that an ultraviolet illumination dosage is distributed in the thickness direction, isomerization from a trans-isomer to a cis-isomer advances in the ultraviolet illumination side. On the other hand, in the opposite side from the ultraviolet illumination side, isomerization from a trans-isomer to a cis-isomer is harder to advance. Therefore, revealed is a positional distribution of a change in ratio of trans-isomer and cis-isomer in the thickness direction, which enables manufacture of a broad band cholesteric liquid crystal film having a selective reflection wavelength bandwidth covering all the region of visible light. A broad band cholesteric liquid crystal film thus obtained works as a broad band circularly polarizing plate and not only has an optical property equal to that of the liquid crystal films disclosed in the publication of JP-A No. 6-281184, the specification of JP No. 3272668 and the specifications of JP-A Nos. 11-248943 and 9-189811 (hereinafter referred to as known patent literatures), but also can decrease a thickness thereof, thereby in addition, enabling low-cost manufacture thereof due to great reduction in manufacturing steps to be realized.

That is, a broad band cholesteric liquid crystal film of the present invention can be formed as a thin layer to thereby enable a use amount of an expensive liquid crystal material to be reduced. Moreover, a total thickness of the liquid crystal layer can be decreased and the number of laminating steps can also be decreased. As a result, the number of steps in manufacture can be decreased, thereby enabling cost reduction owing to increase in line speed to be achieved.

A broad band cholesteric liquid film of the present invention described above has a broad bandwidth of selective reflection wavelength, which is as broad as 200 nm or more. The reflection bandwidth is preferably 300 nm or more and more preferably 400 nm or more. A reflection bandwidth of 200 nm or more preferably lies in a visible light region, especially a wavelength region from 400 to 800 nm.

Note that a reflection bandwidth is a reflection band having reflectance of a half of the maximum reflectance in a reflectance spectrum of a broad band cholesteric liquid crystal film measured with a spectrophotometer (Instant Multiphotometry System Model No. MCPD-2000, manufactured by Otsuka Electronics Co., Ltd.).

BEST MODE FOR CARRYING OUT THE INVENTION

A cholesteric liquid crystal film of the present invention is obtained by ultraviolet polymerizing a liquid crystal mixture containing a polymerizable mesogen compound (a), a polymerizable chiral agent (b) and a photoisomerizable material (c).

A polymerizable mesogen compound (a) preferably has at least one polymerizable functional group and in addition, a mesogen group containing a ring unit and others. As polymerizable functional groups, exemplified are an acryloyl group, a methacryloyl group, an epoxy group, a vinyl ether group and others, among which preferable are an acryloyl group and a methacryloyl group. With a polymerizable mesogen compound (a) having two or more polymerizable functional groups employed, a crosslinked structure is introduced into a cholesteric liquid film to thereby enable durability thereof to be enhanced. Examples of the ring unit constituting a mesogen group include: a biphenyl-based ring unit, a phenylbenzoate-based ring unit, a phenylcyclohexane-based ring unit, an azoxybenzene-based ring unit, an azomethine-based ring unit, an azobenzene-based ring unit, a phenylpyrimidine-based ring unit, a diphenylacetylene-based ring unit, a diphenylbenzoate-based ring unit, a bicyclohexane-based ring unit, a cyclohexylbenzene-based ring unit, a terphenyl-based ring unit and others. An end of each of the ring units may has any of substituents such as a cyano group, an alkyl group, an alkoxy group, a halogen atom. A mesogen group described above may couple with a spacer portion imparting a bendability interposed between the groups itself. As spacer portions, exemplified are a polyethylene chain, a polyoxymethylene chain and others. The number of repeated structural units constituting a spacer portion is properly determined according to a chemical structure of a mesogen moiety, wherein the number of repetition units in a polymethylene chain ranges from 0 to 20 and preferably from 2 to 12 and the number of repetition units in a polyoxymethylene chain ranges from 0 to 10 and preferably 1 to 3.

As a polymerizable mesogen compound (a) having one polymerizable functional group, exemplified is a compound expressed by the following formula:

, wherein $R_1$ indicates a hydrogen atom or a methyl group and n an integer from 1 to 5.

As concrete examples of the polymerizable mesogen compound (a) having one polymerizable functional group, exemplified are the following compounds:

As concrete examples of polymerizable mesogen compounds (a) having two polymerizable functional groups, exemplified are LC242 manufactured by BASF Corp.

As a polymerizable chiral agent (b), exemplified is LC756 manufactured by BASF Corp.

A mixing amount of a polymerizable chiral agent (b) is preferably on the order in the range of from 1 to 20 parts by weight and more preferably in the range of from 3 to 7 parts by weight relative to 100 parts by weight of a total amount of a polymerizable mesogen compound (a) and the polymerizable chiral agent (b). A helical twist power (HTP) is controlled by a ratio of a polymerizable mesogen compound (a) and a polymerizable chiral agent (b). By adjusting the proportion within the range, a reflection band can be selected so that a reflectance spectrum of an obtained cholesteric liquid crystal film can cover all the range of visible light.

As a photoisomerizable material (c), any of compounds causing a photoisomerization reaction can be employed without imposing any specific limitation thereon. Examples of photoisomerizable materials (c) include compounds such as stilbene, stilbenes, azobenzene, azobenzenes, spiropyrans, spirooxazines, diaryl ethers, filgides, cyclophanes, calcons and others. As a photoisomerizable material, among them, it is preferable to use at least one kind selected from the group consisting of stilbene, azobenzene and derivatives thereof. An added amount of a photoisomerizable material (c) is not particularly limited, but preferably on the order in the range of 0.1 to 20 parts by weight and more preferably in the range of from 2 to 10 parts by weight relative to 100 parts by weight of a total amount of a polymerizable mesogen compound (a) and a polymerizable chiral agent (b).

Any kind of photopolymerization initiators (d) can be employed without imposing any specific limitation thereon. Exemplified are IRGACURE 184, IRGACURE 907, IRGACURE 369, IRGACURE 651 and others manufactured by Chiba Specialty Chemicals Corp. A mixing amount of a photopolymerization initiator is preferably on the order in the range of from 0.01 to 10 parts by weight and more preferably in the range of from 0.05 to 5 parts by weight relative to 100 parts by weight of a total amount of a polymerizable mesogen compound (a) and a polymerizable chiral agent (b). Note that a photopolymerization initiator (d) is not necessarily added depending on ultraviolet illumination conditions or an added amount of a photoisomerizable material (c). For example, in a case where a polymerizable mesogen compound (a) and a polymerizable chiral agent (b) each having two polymerizable functional groups are combined and a sufficient fast reaction speed is obtained as expected in the combination, no photopolymerization initiator (d) is required to be added.

In the present invention, a liquid crystal mixture containing a polymerizable mesogen compound (a), a polymerizable chiral agent (b) and a photoisomerizable material (c), and a photopolymerization initiator (d) when required, can be used as a solution obtained by dissolving the mixture into a solvent. Without a specific limitation imposed, preferable as solvents used are methyl ethyl ketone, cyclohexanone, cyclopentanone and others. A concentration of a solution is usually on the order in the range of from 3 to 50 weight %.

Manufacture of a cholesteric liquid crystal film of the present invention is implemented by coating the liquid crystal mixture on a substrate, followed by ultraviolet polymerization.

As substrates, there can be adopted conventionally known members as ones. Exemplified are: a rubbing film obtained by subjecting a thin film made of polyimide, polyvinyl alcohol or the like formed on a substrate to a rubbing treatment with rayon cloth; an obliquely deposition film; optically oriented film obtained by illuminating a polymer having photo-crosslinking group such as cynnamate, azobenzene or the like or a polyimide with polarized ultraviolet; and a stretched film and others. Orientation can be implemented by application of a magnetic field, an electric field and a shearing stress.

Examples of the substrate that are used include: films made of plastics such as polyethylene phthalate, triacetyl cellulose, norbornen resin, polyvinyl alcohol, polyimide, polyallylate, polycarbonate, polysulfone, polyethersulfone and others; a glass plate, a quartz sheet and others.

A liquid crystal mixture described above is coated on one substrate and thereafter, the other substrate can be laminated on the coat. In case where the liquid crystal mixture is a solution, the solution is coated on one substrate and the coat is dried, followed by laminating the other substrate on the coat. A drying temperature for evaporating a solvent has only to be a temperature of the boiling temperature of the solvent or higher. The temperature is only required to be set usually in the range of 80 to 160° C. according to a kind of a solvent.

A thickness of a coat of a liquid crystal mixture described above (in a case of a solution, a thickness of a coat in a dry state after a solvent is evaporated) is preferably on the order in the range of from 1 to 20 µm and more preferably on the order in the range of 2 to 10 µm. If a coat thickness is less than 1 µm, there rises an unprofitable tendency to decrease a polarization degree though a reflection bandwidth is secured. On the other hand, if the thickness is more than 20 µm, more of improvement is unprofitably not realized on a reflection bandwidth or polarization degree only to increase a cost.

An ultraviolet illuminance is preferably in the range of from 0.1 to 30 mW/cm$^2$ and more preferably in the range of from 1 to 20 mW/cm$^2$. An illumination time is preferably a shorter time of 5 min or less, more preferably 3 min or less and furthers more preferably 1 min or less. Note that if heating is applied on the opposite side from an ultraviolet illumination side, a broad band cholesteric liquid crystal film can be realized in a shorter time.

A heating temperature, on or after ultraviolet illumination, has only to be a liquid crystal temperature or higher and usually preferably 140° C. or lower in a general practice. The temperature is, to be concrete, preferably on the order in the range of from 60 to 140° C. and more preferably in the range of 80° C. to 120° C. With heating applied, an effect is exerted that a diffusion speed of a monomer component is accelerated. If the temperature is lower than 60° C., a diffusion speed of a polymerizable mesogen compound (a) is very slow, requiring a very long time in order to achieve a broad band.

A thus obtained cholesteric liquid crystal film may be used either not being separated from a substrate or being separated therefrom.

A broad band cholesteric liquid crystal film of the present invention is used as a circularly polarizing plate. A circularly polarizing plate with a λ/4 plate laminated thereon can be used as a linearly polarizer. A cholesteric liquid crystal film, which is a circularly polarizing plate, is preferably laminated on a λ/4 plate so that a pitch length in the film is narrowed toward the λ/4 plate continuously.

As λ/4 plates, exemplified are: a birefringent film obtained by stretching a film made of a proper plastic such as polycarbnate, norbornen resin, polyvinyl alcohol, polystyrene, polymethylmethacrylate, polypropylene, other polyolefins, polyallylate, polyimide; a aligned film made of a liquid crystal material such as a liquid crystal polymer; an aligned layer of a liquid crystal material supported by a film; and others. A thickness of a λ/4 plate is usually preferably in the range of from 0.5 to 200 µm and especially preferably in the range of from 1 to 100 µm.

A retardation plate functioning as a λ/4 plate in a broad wavelength range such as a visible light region can be obtained, for example, by a scheme to superimpose a retardation layer functioning as a λ/4 plate for a monochromatic light of wavelength of 550 nm and a retardation layer exhibiting another retardation characteristic, for example a retardation layer functioning as a λ/2 plate on each other or the like scheme. Therefore, a retardation plate arranged between a polarizing plate and a brightness enhancement improving film may be made of either one retardation layer, or two or more retardation layers.

An absorption polarizer is adhered to the linearly polarizer, so that a transmission axis direction of the linearly polarizer are arranged in parallel with each other.

The polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film containing dichromatic materials such as iodine is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A polarizing plate on which a transparent protective film prepared on one side or both sides of the polarizer is used. Materials of the transparent protective, excellent in transparency, mechanical strength, heat stability, water shielding property, isotropy etc., is may be preferably used, As transparent protective films, for example, transparent polymer films made of polyester type polymers, such as polyethylene terephthalate and polyethylenenaphthalate; cellulose type polymers, such as diacetyl cellulose and triacetyl cellulose; polycarbonate type polymer; acrylics type polymer, such as poly methylmethacrylate may be mentioned. Besides, as examples of the transparent polymer films made of styrene type polymers, such as polystyrene and acrylonitrile-styrene copolymer; polyolefin type polymers, such as polyethylene, polypropylene, polyolefin that has cyclo-type or norbornen structure, ethylene-propylene copolymer; vinyl chloride type polymer; amide type polymers, such as nylon and aromatic polyamide may be mentioned. Besides, as examples of the transparent polymer films made of imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially, preferable when being used is a film made of a transparent polymer with less of optical birefringence. Preferable from the viewpoint of a protective film for a polarizing plate are triacetyl cellulose, polycarbonate, acrylics type polymer, a cyclo-olefine type resin, polyolefin having a norbornen structure and others.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

As a transparent protective film preferably used, in viewpoint of polarization property and durability, triacetyl cellulose film whose surface is saponificated with alkali is suitable. In general, a thickness of a transparent protective film is about 10 through 500 μm, preferably 20 through 300 μm, and especially preferably 30 through 200 μm.

Moreover, it is preferable that the transparent protective film may have as little coloring as possible. Accordingly, a protective film having a retardation value in a film thickness direction represented by $Rth=[(nx+ny)/2-nz] \times d$ of $-90$ nm through $+75$ nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of $-90$ nm through $+75$ nm in a thickness direction. The retardation value (Rth) in a thickness direction is preferably $-80$ nm through $+60$ nm, and especially preferably $-70$ nm through $+45$ nm.

The transparent protective films on the front and back sides may also be transparent protective films made of either the same polymer material or respective different polymer materials.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle magnifying function etc.) for diffusing transmitting light through the polarizing plate and magnifying a viewing angle etc.

In addition, the above-mentioned antireflection layer, sticking prevention layer, diffusion layer, anti glare layer, etc. may be built in the protective film itself, and also they may be prepared as an optical layer different from the protective layer.

The linearly polarizer described above can be provided with a pressure sensitive adhesive layer for adhering itself to another member such as a liquid crystal cell or the like. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

In addition to the above description, a pressure sensitive adhesive layer low in moisture absorption rate and excellent in heat resistance is preferable from the viewpoints of prevention of a foaming phenomenon and peeling-off phenomenon due to moisture absorption, prevention of degradation in optical characteristic and warp of a liquid crystal cell due to the difference of thermal expansion or the like and further, in consideration of formability of a high quality liquid crystal display excellent in durability and the like.

The pressure sensitive adhesive layer may contain additives, for example, such as natural or synthetic resins, tackifier, glass fibers, glass beads, metal powder, fillers comprising other inorganic powder etc., pigments, colorants and antioxidants. Moreover, it may be a pressure sensitive adhesive layer that contains fine particle and shows optical diffusion nature.

Proper method may be carried out to attach a pressure sensitive adhesive layer. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizer using suitable developing methods, such as flow method and coating method, or a method in which an adhesive layer is once formed on a separator, as mentioned above, and is then transferred on a an optical film may be mentioned. A pressure sensitive adhesive layer may be prepared with two or more layers which are made of different compositions or kinds with each layer. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of a pressure sensitive adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, ultraviolet absorbing property may be given to the above-mentioned each layer, such as a pressure sensitive adhesive layer, using a method of adding UV absorbents, such as salicylic acid ester type compounds, benzophenol type compounds, benzotriazol type compounds, cyano acrylate type compounds, and nickel complex salt type compounds.

A linearly polarizer of the present invention can be preferably used in manufacture of various kinds of apparatuses such as a liquid crystal display and others. Assembling of a liquid crystal display may be carried out according to conventional methods. That is, a liquid crystal display is generally manufactured by suitably assembling several parts such as a liquid crystal cell, optical elements and, if necessary, lighting system, and by incorporating driving circuit. In the present invention, except that a linearly polarizer by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned linearly polarizer has been located at one side or both sides of the liquid crystal cell, and with which a backlight or a reflector is used for a lighting system may be manufactured. In this case, the linearly polarizer by the present invention may be installed in one side or both sides of the liquid crystal cell. When installing the linearly polarizers in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Figure 6:
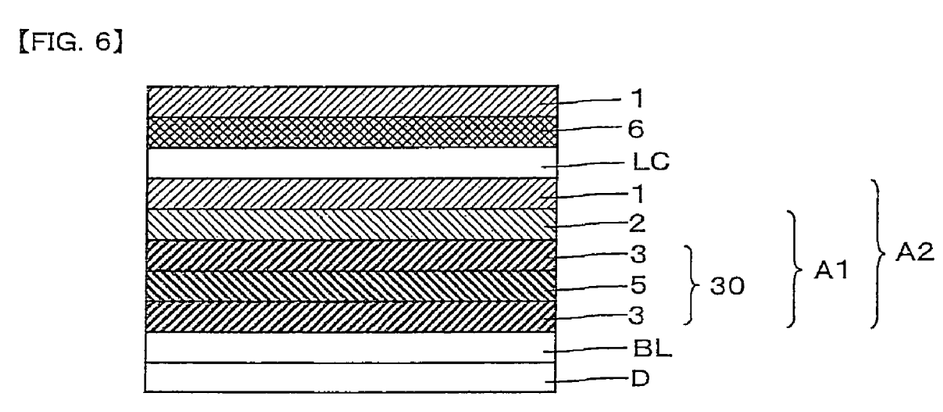
FIG. 6 is a conceptual view of a wide viewing angle liquid crystal display manufactured in Example 5, wherein a numerical symbol (1) indicates an absorption polarizing plate, (2) a λ/4 plate, (3) a cholesteric liquid crystal film (reflection polarizer (a)), (5) a retardation plate (b): C plate, (6) a viewing angle magnification film (diffuse pressure sensitive adhesive), (LC) a liquid crystal cell, (BL) backlight, (D) diffusing reflective plate, (30) a polarizing element, (A1) a linearly polarizer and (A2) a linearly polarizer obtained by laminating the absorption polarizing plate (1) on the linearly polarizer (A1).

A circularly polarizing plate (a reflection polarizer) using a cholesteric liquid crystal film described above is used in a polarizing element system in which a retardation layer (b) having a front face retardation (in the normal direction) of almost zero and a retardation of $\lambda/8$ or more relative to an incident light incoming at an angle of 30° C. or more inclined from the normal direction is arranged between at least two layer reflection polarizer (a) with respective selective reflection wavelength bands of polarized light superimposed on each other. Note that a cholesteric liquid crystal film is of a construction in which any of the sides of the maximum pitch of a helically twisted molecular structure and the minimum pitch thereof may be located closer to the retardation layer (b), while if a reflection polarizer (a) is expressed by (maximum pitch/minimum pitch), arrangement thereof is preferably in a structure of maximum pitch/minimum pitch/retardation layer (b)/maximum pitch/minimum pitch from the view point of a viewing angle (in other words, a better viewing angle and less of coloring abnormality). In a case where a $\lambda/4$ plate is combined as shown in FIG. 6, the minimum pitch side of a reflection polarizer (a) is preferably arranged closer to the $\lambda/4$ plate.

The polarizing element system, that is a cholesteric liquid crystal laminate having a broad band selective reflection function, has a circularly polarizing light reflection/transmission function in the front face direction and can be used in a liquid crystal display as a broad band circularly polarizing plate. In this case, the cholesteric liquid crystal laminate is arranged on the light source side of a liquid crystal cell in a circularly polarizing mode, for example a transmission type VA mode liquid crystal cell having a multidomain and thereby can be used as a circularly polarizing plate.

The retardation layer (b) has a retardation of almost zero in the front face direction and a retardation of $\lambda/8$ or more relative to an incident light incoming at an angle of 30° inclined from the normal direction. The front face retardation works for holding polarized light vertically, which is desirably $\lambda/10$ or less.

In order to effectively polarization-convert an incident light incoming in an oblique direction, a retardation of the incident light is properly determined by an angle at which the light is totally reflected. For example, in order to totally reflect an incident light at an angle of the order of 60° inclined from the normal, retardation as measured at 60° has only to be determined so as to be a value of the order of $\lambda/2$. Since transmitted light through the reflection polarizer (a) is modulated with respect to a polarization state thereof even due to birefringence like a C plate of the reflection polarizer itself, a retardation as measured at the angle of a C plate inserted may be usually a value smaller than $\lambda/2$. Since a retardation of the C plate monotonously increases with an inclination of an incident light, a retardation has only to be $\lambda/8$ or more relative to an incident light incoming at an angle of 30° as a target at which effective total reflection is caused at an angular inclination of 30° or more.

A material of the retardation layer (b) may be any of materials having the above described optical property without any specific limitation thereon. Examples thereof include: a layer having a fixed planar alignment state of a cholesteric liquid crystal having a selective reflection wave length other than the visible light region (from 380 nm to 780 nm); a layer having a fixed homeotropic alignment state of a rod-like liquid crystal; a layer using a columnar alignment or a nematic alignment of a discotic liquid crystal; a layer aligned a negative uniaxial crystal in-plane; a biaxially aligned polymer film; and others.

In the present invention, a C plate in which fixed is a planar alignment state of a cholesteric liquid crystal having a selective reflection wavelength other than the visible light region (from 380 nm to 780 nm) desirably has no coloring abnormality in the visible light region as a selective reflection wavelength of a cholesteric liquid crystal. Therefore, a necessity arises for no selective reflection light in the visible light region. Selective reflection is specifically determined by a cholesteric chiral pitch and a refractive index of a liquid crystal. While a value of a central wavelength of selective reflection may be in the near infrared region, the value is desirably in an ultraviolet region of 350 nm or less in wavelength because of an influence of rotatory polarization and generation of slightly complex phenomenon. Formation of a cholesteric liquid crystal layer is conducted in a similar way to that in formation of a cholesteric layer in a reflection polarizer described above.

A C plate having a fixed homeotropic alignment state in the present invention is made of a polymer liquid crystal having been obtained by polymerizing a liquid crystalline thermoplastic resin exhibiting a nematic liquid crystallinity at high temperature or a liquid crystal monomer and an alignment agent, when required, with an ionizing radiation such as an electron beam, ultraviolet or the like; or heating; or a mixture of polymer liquid crystals. While a liquid crystallinity may be either lyotropic or thermotropic, a thermotropic liquid crystal is desirable from the view point of ease of control and formability of monodomain. A homeotropic alignment is obtained for example in a procedure in which a birefringent material described above is coated on a film made of a vertical aligned film (such as a film of a long chain alkylsilane) and a liquid crystal state is revealed in the film and fixed.

As a C plate using a discotic liquid crystal, there is available a plate obtained by revealing and fixing a nematic phase or a columnar phase of a triphenylene compounds each having an in-plane spread molecule as a liquid crystal material or a discotic liquid crystal material having a negative uniaxiality such as phthalocyanines. Inorganic layered compounds each with a negative uniaxiality are detailed in the publication of JP-A No. 6-82777 and others.

A C plate using a biaxial alignment of a polymer film can be obtained by one of the following methods, in which a polymer film having a positive refractive index anisotropy is biaxially stretched in a good balance; in which a thermoplastic resin is pressed; in which a C plate is cut off from a parallel aligned crystal; and in others.

While lamination of layers may be only as superimposed, the lamination is desirable to use an adhesive or a pressure sensitive adhesive from the viewpoint of workability and light utilization efficiency. In the case, it is desirable that an adhesive or a pressure sensitive adhesive is transparent and has no absorption in the visible light region, and a refractive index is as equal to each of refractive indexes of the other layers as possible from the viewpoint of suppression of surface reflection. From the viewpoint, for example, an acrylic pressure sensitive adhesive or the like is preferably used. Lamination of layers can be implemented according to the following methods: in which layers are formed in monodomains separately as respective aligned films and sequentially layered onto a translucent substrate by transfer or the like scheme; and in another of which aligned films are properly formed for alignment without providing adhesive layers and the layers are sequentially formed directly on a previous layer.

Other procedures can be adopted: in which particles are further added onto layers and adhesive or pressure sensitive adhesive layers for adjustment of a diffuse level, when required, to thereby impart an isotropic scatterability; and in another of which properly added are an ultraviolet absorbent, an antioxidant and a surfactant for the purpose to impart a leveling property on film formation.

While a polarizing element (a cholesteric liquid crystal laminate) of the present invention has a circularly polarized light reflection/transmission function, the element is combined with a λ/4 plate to thereby convert a transmitted light to a linearly polarized light and enable it to be used as a linearly polarizer.

Examples of λ/4 plates that are properly used are not particularly limited, but include: a general purpose transparent resin film generating a retardation by stretching such as films made of polycarbonate, polyethylene terephthalate, polystyrene, polysulfone, polyvinyl alcohol, polymethylmethacrylate or the like; a norbornen resin film such as an ARTON film manufactured by JSR; and others. Furthermore, biaxial stretching is applied and a retardation plate compensating a change in retardation caused by an incidence angle is used to thereby enable a viewing angle characteristic to be improved, which is preferable. There may also be used a λ/4 plate obtained by fixing a λ/4 layer prepared by aligning a liquid crystal which reveals no retardation by resin stretching. In this case, a thickness of a λ/4 plate can be greatly reduced. A thickness of a λ/4 plate is usually preferably in the range of from 0.5 to 200 μm and especially preferably in the range of from 1 to 100 μm.

While a λ/4 plate well works only for a specific wavelength in a case of a single layer made of a single material, a problem for other wavelengths arises that a function as a λ/4 plate is degraded with respect to a wavelength dispersing characteristic for other wavelengths. Therefore, by laminating while defining an axial angle relative to a λ/2 plate, a λ/4 plate can be used as a broad band λ/4 plate functioning in a range in which no practical inconvenience arises in the entire visible light region. A λ/4 plate and a λ/2 plate in this case may be made with the same material, or a λ/4 plate is made with a different material obtained in a similar way to that in the case of the λ/4 plate described above and may be combined with the λ/2 plate.

For example, a λ/4 plate (140 nm) is laminated on a broad band circularly polarizing plate and a λ/2 plate (270 nm) is disposed at 117.5° relative to an axial angle of the λ/4 plate. A transmission polarization axis is 10° relative to the axis of the λ/4 plate. Since the adhering angle changes according to a retardation value of each retardation plate, the adhering angle is not specifically limited.

An absorption polarizer is adhered to the linearly polarizer so that a transmission axis direction of the absorption polarizer and a transmission axis of the linearly polarizer are arranged in parallel with each other.

Arrangement of Diffusing Reflective Plate

A diffusing reflective plate is desirably arranged at the down side (the other side from an arrangement surface of a liquid cell) of a light guide plate as a light source. A main component of light reflected by a collimate film is an oblique incident light component and the main component of light is specular reflected by the collimate film and reflected back in the backlight direction. On this occasion, in a case where a reflective plate on the back surface side is high in specular reflection, a reflective angle is retained and cannot be emitted in the front face direction only to end up with light loss. Therefore, a reflective angle of reflected-back light is not retained to thereby increase a scattering reflection component in the front face direction; therefore the arrangement of a diffusing reflective plate is desirable.

Arrangement of Diffuse Plate

It is also desirable to place a proper diffuse plate between a collimate film in the present invention and the backlight source. This is because light impinged obliquely and reflected is scattered in the vicinity of a backlight guide plate and part of the reflected light is scattered in the vertical incidence direction to thereby enhance a second utilization of light.

A diffuse plate used can be obtained by means of a method in which an unevenness surface utilized, or in which particles with different refractive indexes are embedded in a resin. The diffuse plate either may be inserted between a collimate film and a backlight or may be adhered to a collimate film.

In a case where a liquid crystal cell to which a collimate film is adhered is placed adjacent to a backlight, there is a chance to cause a Newton ring in a clearance between a film surface and the backlight, while by placing a diffuse plate having an unevenness surface on the light guide plate side surface of the collimate film in the present invention, it can be suppressed to generation of Newton ring. Moreover, a layer serving as an unevenness surface and a light diffusing structure may be formed as a surface itself of a light parallel film in the present invention.

Arrangement of View Angle Magnifying Film

Magnification of a viewing angle in a liquid crystal display of the present invention can be achieved by obtaining a uniform and good display characteristic all over the viewing angle through diffusing light of good display characteristic in the vicinity of the front face obtained from a liquid crystal display combined with a collimated backlight.

A viewing angle magnification film used here is a diffuse plate having substantially no backscattering. A diffuse plate can be provided as a diffusing pressure sensitive adhesive material. An arranging place thereof can be used up or down of a polarizing plate on the viewer side of the liquid crystal display. In order to prevent reduction in contrast due to an influence such as blotting of pixels or a slightly remaining backscattering, the diffuse plate is desirably placed in a layer at a position the closest possible to a cell such as between a polarizing plate and a liquid crystal cell. In this case, it is desirable to use a film that does not substantially cancel polarization. A fine particle distribution type diffuse plate is preferably used, which is disclosed in, for example, the publications of JP-A No. 2000-347006 and JP-A No. 2000-347007.

In a case where a viewing angle magnification film is disposed outside of a polarizing plate, a viewing angle compensating retardation plate may not be used especially if a TN liquid cell is used since collimated light is transmitted through a liquid crystal layer and through the polarizing plate. If an STN liquid crystal cell is used in the case, it has only to use a retardation plate that is well compensated with respect to a front face characteristic. Since, in this case, a viewing angle magnification film has a surface exposed to the air; a type having a refractive effect due to a surface profile can also be employed.

On the other hand, in a case where a viewing angle magnification film is inserted between a polarizing plate and a liquid crystal layer, light is diffuse light at the stage where light is transmitted through the polarizing plate. If a TN liquid crystal is used, a necessity arises for compensating a viewing angle characteristic of the polarizer itself. In this case, it is necessary to insert a retardation plate to compensate a viewing angle characteristic of a polarizer between the polarizer and the viewing angle magnification film. If an STN liquid crystal is used, it is necessary to insert a retardation plate to compensate a viewing angle characteristic of the polarizer in addition to a front face retardation compensation for the STN liquid crystal.

In a case of a viewing angle magnification film having a regular structure in the interior thereof such as a microlens array film or a hologram film, both conventionally having been available, interference has occurred with a fine structure such as a microlens array, a prism array, a louver, a micromirror array or the like that is included in a black matrix of a liquid crystal display or a collimate system of a conventional backlight to thereby cause a moiré pattern with ease. Since in a collimate film in the present invention, a regular structure is not visually recognized in a plane thereof and emitting light has no regularity modulation, no necessity arises for consideration of matching with a viewing angle magnification film or an arrangement sequence. Therefore, a viewing angle magnification film has a lot of options since no specific limitation is imposed thereon as far as neither interference nor a moiré pattern occurs with a pixel black matrix of a liquid crystal display.

In the present invention, as viewing angle magnification films, preferably used are a light scattering plate, having no substantial backscattering and not canceling polarization, which is described in any of the publications of JP-A Nos. 2000-347006 and 2000-347007 and which has a haze in the range of 80% to 90%. Any of films each of which has a regular structure in the interior thereof such as a hologram sheet, a microprism array, a microlens array or the like can be used as far as neither interference nor a moiré pattern occurs with a pixel black matrix of a liquid crystal display.

Note that for use in a liquid crystal display, various kinds of optical layers are properly prepared according to ordinary methods.

EXAMPLES

Description will be given of the present invention showing examples and comparative examples below, while the present invention is not limited to the examples.

Example 1

Prepared was a methyl ethyl ketone solution (with a solid matter content of 30 wt %) of a mixture composed of 96 parts by weight of LC242 manufactured by BASF Corp. as a polymerizable mesogen compound (a), 4 parts by weight of LC756 manufactured by BASF Corp. as a polymerizable chiral agent (b) and 5 parts by weight of stilbene as a photoisomerizable material (c). The solution was cast on one stretched polyethylene terephthalate substrate and a solvent was removed off at 100° C. for 2 min for drying, followed by laminating the other polyethylene terephthalate substrate thereon. Then, the laminate was applied with ultraviolet illumination at 5 mW/cm$^2$ for 3 min and further with heating at 100° C. for 10 sec, thereby obtaining a cholesteric liquid crystal film as a target.

Figure 1:
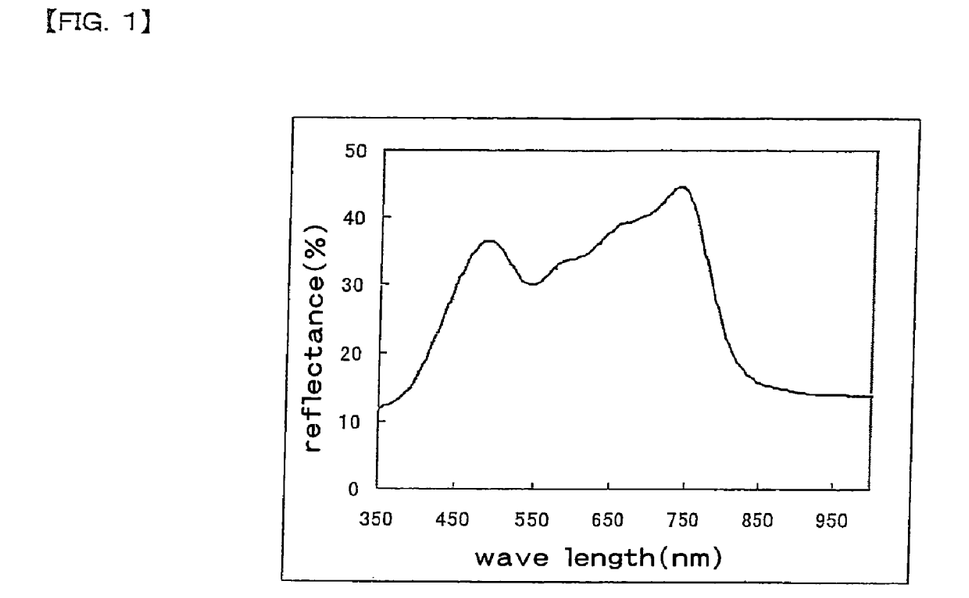
FIG. 1 is a reflectance spectrum of a cholesteric liquid crystal film manufactured in Example 1.

The one polyethylene terephthalate substrate was removed. A reflectance spectrum of a cholesteric liquid crystal film (a circularly polarizing plate) is shown in FIG. 1. The circularly polarizing plate had a good circularly polarized light separating characteristic (a reflection band) in the wavelength range of from 400 to 800 nm. A total thickness of the cholesteric liquid crystal layer (film) was 10 μm. A pitch length in the obtained cholesteric liquid crystal layer was 0.2 μm in the vicinity of an ultraviolet illuminated surface (in the lower layer at 1 μm below the ultraviolet illuminated surface), while being 0.5 μm in the vicinity of the opposite surface (in the lower layer at 1 μm below the opposite surface). A pitch length was measured with a sectional TEM photograph. A broad band cholesteric liquid crystal film covering visible light was able to be manufactured as a single layer in this way.

Example 2

Prepared was a methyl ethyl ketone solution (with a solid matter content of 20 wt %) of a mixture composed of 96 parts by weight of the above described compound (1) as a polymerizable mesogen compound (a), 4 parts by weight of LC756 manufactured by BASF Corp. as a polymerizable chiral agent (b), 5 parts by weight of azobenzene as a photoisomerizable material (c) and 5 parts by weight of IRGACURE 369 (manufactured by Chiba Specialty Chemicals Corp.) as a photopolymerization initiator (d). The solution was cast on one stretched polyethylene terephthalate substrate and a solvent was removed off at 100° C. for 2 min for drying. Then, the laminate was applied with ultraviolet illumination at 20 mW/cm$^2$ for 10 sec and further with heating, thereby obtaining a cholesteric liquid crystal film as a target.

Figure 2:
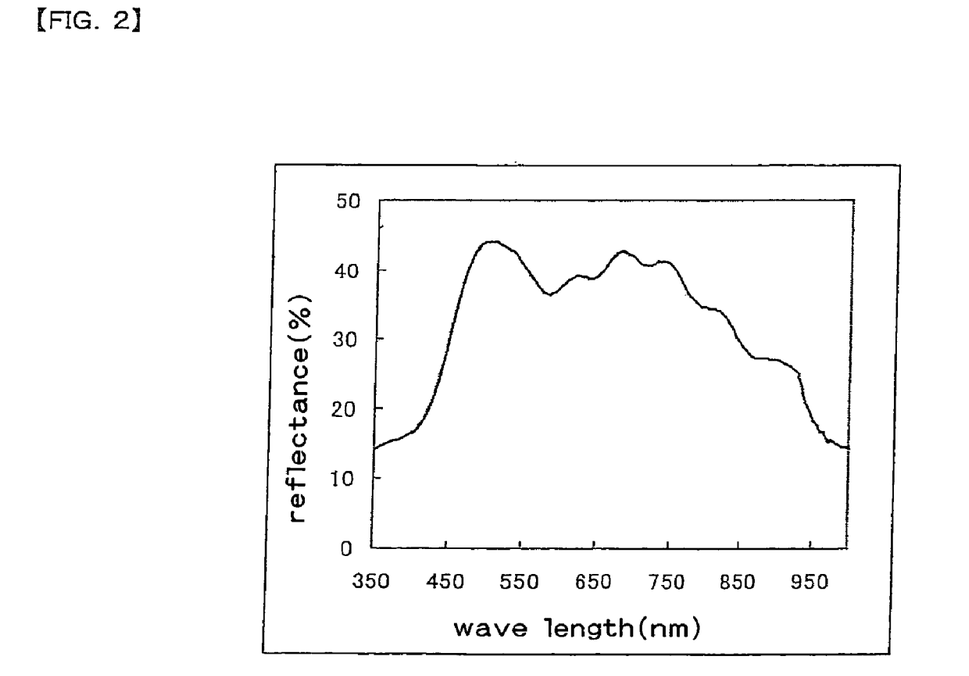
FIG. 2 is a reflectance spectrum of a cholesteric liquid crystal film manufactured in Example 2.

A reflectance spectrum of a cholesteric liquid crystal film (a circularly polarizing plate) is shown in FIG. 2. The obtained circularly polarizing plate had a good circularly polarized light separating characteristic in the wavelength range of from 450 to 900 nm). A total thickness of the cholesteric liquid crystal layer (film) was 6 μm. A pitch length in the obtained cholesteric liquid crystal layer was 0.25 μm in the vicinity of an ultraviolet illuminated surface (in the lower layer at 1 μm below the ultraviolet illuminated surface), while being 0.6 μm in the vicinity of the opposite surface (in the lower layer at 1 μm below the opposite surface). A broad band cholesteric liquid crystal film covering visible light was able to be manufactured as a single layer in this way.

Example 3

The broad band cholesteric liquid crystal film (a circularly polarizing plate) obtained in Example 1 was adhered to a λ/4 plate obtained by biaxially stretching a polycarbonate resin film (a thickness of 80 μm) in the direction along which a pitch length is narrower continuously toward the λ/4 plate with an acrylic pressure sensitive adhesive with a thickness of 25 μm. Furthermore, an absorption type polarizing plate TEG1465DU manufactured by NITTO DENKO CO., LTD. was adhered thereto so that the transmission axis directions coincide with each other, to obtain a broad band polarizing plate.

The broad band polarizing plate was used as a lower plate for a TFT-LCD and placed on a side light type backlight, and a brightness enhancement percentage was measured with the result of a brightness enhancement 1.3 or more times as that in a case where a product of the present invention is not used. A brightness was measured with a viewing angle measuring instrument EZ-CONTRAST manufactured by ELDIM Corp. Note that the obtained optical characteristic (a reflectance spectrum) was equal in performance to a case where a film obtained in the above known patent literatures was used.

Example 4

Prepared was a cyclopentanone solution (with a solid matter content of 30 wt %) of a mixture composed of 88.6 parts by weight of a photopolymerizable nematic liquid crystal monomer (manufactured by BASF Corp. with a trade name of LC242), 11.4 parts by weight of a chiral agent (manufactured by BASF Corp. with a trade name of LC756) and 5 parts by weight of a photopolymerization initiator (manufactured by Chiba Specialty Chemicals Corp. with a trade name of IRGACURE 907). The solution was mixed for adjustment so that a selective reflection wavelength is 350 nm. The solution was coated on a polyethylene terephthalate substrate to a thickness after drying of 4 μm using a wire bar and a solvent was removed off for drying. Thereafter, the film was temporarily heated to an isotropic transition temperature of the liquid crystal monomer and thereafter, gradually cooled to form a layer in a uniformly oriented state. The obtained layer was illuminated with ultraviolet to fix an aligned state and obtain a C plate (negative). A retardation of the C plate was measured to be 2 nm in the front face direction and 100 nm in a direction oblique by 30° for light having a wavelength of 550 nm.

On the other hand, two broad band cholesteric liquid films (circularly polarizing plates that is reflection polarizers) obtained in Example 1 were prepared. The C plate layer was transferred on the reflection polarizer layer using a translucent adhesive. The same reflection polarizer layer was transferred and laminated on the C plate using a translucent adhesive layer to obtain a polarizing element. A λ/4 plate made of a biaxially stretched polyethylene terephthalate was adhered to the polarizing element so that the transmission axis coincides with that of the polarizing plate and further adhered to a TFT liquid crystal display and placed on a dot printing type backlight. In this sample, polarizing plates (manufactured by NITTO DENKO CO., LTD. with a trade name of SEG1425DU) are singly used on the front and back side, respectively, of a liquid crystal cell without using a viewing angle compensating film in the TFT liquid crystal display. Ordinary TN cell was used in the interior of the cell. Any of prism sheets and others were not used.

A mat PET diffusing reflective plate was arranged at the down surface of the backlight. The obtained collimate system condenses light to the front face in a similar way to that of a prism light collective sheet and furthermore, transmits circularly polarized light, and a thickness thereof was extremely thin and takes a value of the order of one-twentieth of a thickness of 500 μm of a product of two prism sheets+a reflection polarizer combined. A light condensing characteristic was on the order ±50° from the vertical direction of the screen image.

Example 5

A sample was prepared in a similar way to that in Example 4 with the exception that used as a C plate was a retardation plate with a retardation value of 120 nm as measured in a state where being obliquely inclined by 30°, and a light diffusing pressure sensitive adhesive layer having a haze of 92% (of a thickness of 25 μm) obtained by dispersing silica true spherical particles (with a particle diameter of 4 μm and a mixing amount of 30% by weight) into an acrylic pressure sensitive adhesive (with a thickness of 30 μm and a refractive index of 1.47) is placed and adhered between a polarizing plate on the front surface side and a liquid crystal cell of a liquid crystal display. In the sample, a light condensing characteristic in the front face direction was narrowed substantially to the order of ±30°. An obtained wide viewing angle liquid crystal display does not cause gray scale inversion within ±60° and maintains a good display characteristic in a viewing angle characteristic recognition using a gray scale representation.

Comparative Example 1

Figure 3:
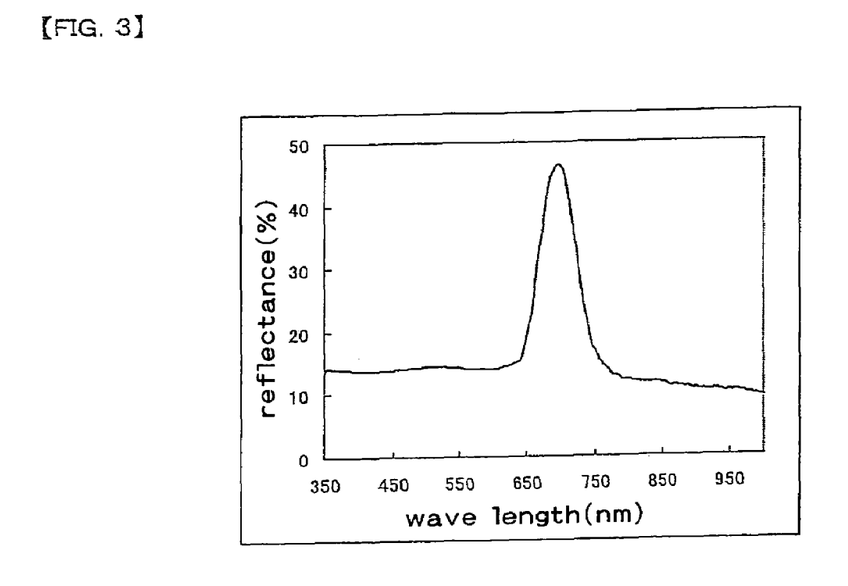
FIG. 3 is a reflectance spectrum of a cholesteric liquid crystal film manufactured in Comparative Example 1.

Prepared was a methyl ethyl ketone solution (with a solid matter content of 30 wt %) of a mixture composed of 96 parts by weight of LC242 manufactured by BASF Corp. as a polymerizable mesogen compound (a) and 4 parts by weight of LC756 manufactured by BASF Corp. as a polymerizable chiral agent (b). A cholesteric liquid crystal film was obtained in a similar way to that in Example 1 with the exception that the above described solution was employed. A reflectance spectrum of a cholesteric liquid crystal film (a circularly polarizing plate) is shown in FIG. 3. The obtained circularly polarizing plate had a good circularly polarized light separating characteristic in the wavelength range of from 650 to 750 nm. A pitch length in the obtained cholesteric liquid crystal layer was 0.44 μm in the vicinity of an ultraviolet illuminated surface (in the lower layer at 1 μm below the ultraviolet illuminated surface), while being 0.46 μm in the vicinity of the opposite surface (in the lower layer at 1 μm below the opposite surface). It is found from FIG. 3 that a reflection band is narrower as compared with that in Example 1.

Comparative Example 2

Figure 4:
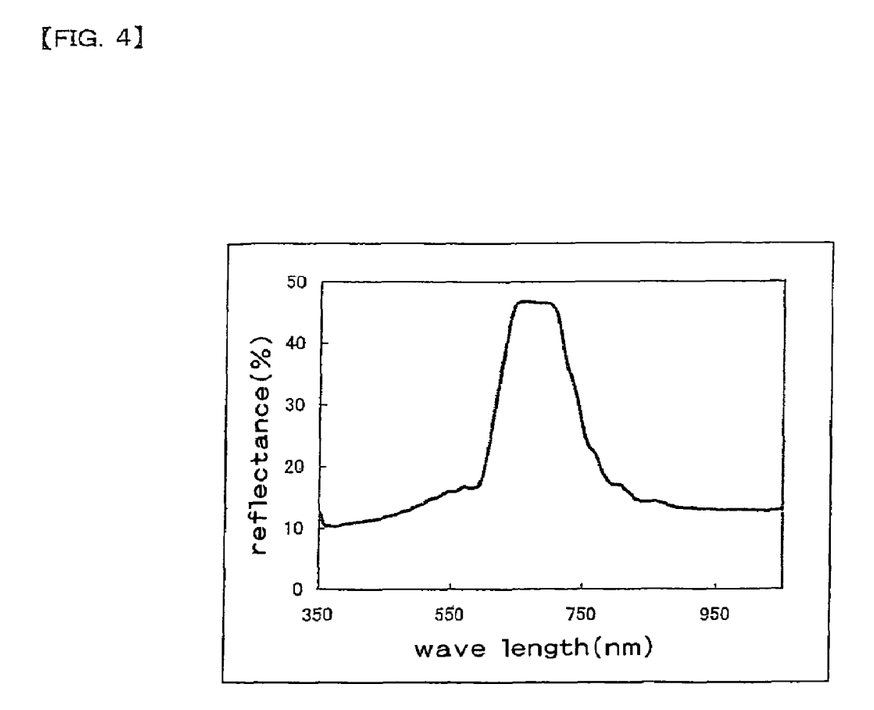
FIG. 4 is a reflectance spectrum of a cholesteric liquid crystal film manufactured in Comparative Example 2.
Figure 5:
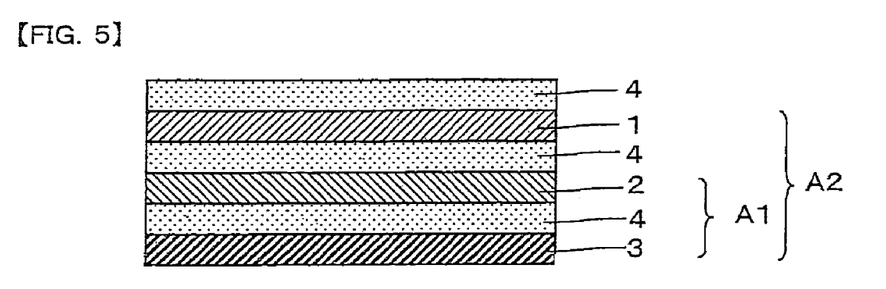
FIG. 5 is a conceptual view of a broad band polarizing plate used in Example 3, wherein a numerical symbol (1) indicates an absorption polarizing plate, (2) a λ/4 plate, (3) a cholesteric liquid crystal film (circularly polarizing plate), (4) a pressure sensitive adhesive layer, (A1) a linearly polarizer and (A2) a linearly polarizer obtained by laminating the absorption polarizing plate (1) on the linearly polarizer (A1).

Prepared was a methyl ethyl ketone solution (with a solid matter content of 20 wt %) of a mixture composed of 96 parts by weight of the above described compound (1) as a polymerizable mesogen compound (a), 4 parts by weight of LC756 manufactured by BASF Corp. as a polymerizable chiral agent (b) and 5 parts by weight of IRGACURE 369 (manufactured by Chiba Specialty Chemicals Corp.) as a photopolymerization initiator (d). A cholesteric liquid crystal film was obtained in a similar way to that in Example 2 with the exception that the above described solution was employed. A reflectance spectrum of the cholesteric liquid crystal film (a circularly polarizing plate) is shown in FIG. 4. The obtained circularly polarizing plate had a good circularly polarized light separating characteristic in the wavelength range of from 600 to 750 nm. A pitch length in the obtained cholesteric liquid crystal layer was 0.4 μm in the vicinity of an ultraviolet illuminated surface (in the lower layer at 1 μm below the ultraviolet illuminated surface), while being 0.45 μm in the vicinity of the opposite surface (in the lower layer at 1 μm below the opposite surface). A broad band cholesteric liquid crystal film covering visible light was able to be manufactured as a single layer in this way. It is found from FIG. 4 that a reflection band is narrower as compared with that in Example 2.

Comparative Example 3

An aligned film made of polyvinyl alcohol with a thickness of 0.1 μm was formed on a triacetyl cellulose film and subjected to a rubbing treatment, and thereafter, three layers made of a cholesteric liquid crystal polymer with respective selective reflection central wavelengths of 610 nm, 550 nm and 450 nm and all with a thickness of 2 μm were sequentially formed and aligned. A λ/4 plate obtained by biaxially stretching a polycarbonate resin film (with a thickness of 80 μm) was adhered onto the cholesteric liquid crystal film to obtain a linearly polarizer. A polarizing plate (manufactured by NITTO DENKO CO., LTD. with a trade name of TEG1465DU) was adhered to the linearly polarizer so that the transmission axis direction coincides with that of the polarizing plate to obtain a polarizing plate integrated polarizing element. The polarizing element is used as a lower plate of a TET-LCD and placed on a side light type backlight to measure a brightness enhancement percentage. A brightness was lowered by 30% or more as compared with that of Example 1.

INDUSTRIALLY APPLICABILITY

A broad band cholesteric liquid crystal film of the present invention is useful as a circularly polarizing plate (a reflection polarizer). The circularly polarizing plate can be used as a linearly polarizer, a luminaire, a liquid crystal display and others, and in addition thereto, in a polarizing element system and a wide viewing angle liquid crystal display.

The invention claimed is:

1. A broad band cholesteric liquid crystal film comprising: a cholesteric liquid crystal film having a reflection bandwidth of 400 nm or more and a pitch length that changes continuously, obtained by coating a liquid crystal mixture containing a polymerizable mesogen compound (a), a polymerizable chiral agent (b) and a photoisomerizable material (c) on a substrate and polymerizing by ultraviolet radiation, wherein the photoisomerizable material (c) is at least one photoisomerizable material selected from the group consisting of stilbene of structural formula (I) and azobenzene of structural formula (II)

2. The broad band cholesteric liquid crystal film according to claim 1, wherein the liquid crystal mixture further comprises a photopolymerization initiator (d).

3. The broad band cholesteric liquid crystal film according to claim 1, wherein the polymerizable mesogen compound (a) has one, or two or more of polymerizable functional groups, the polymerizable chiral agent (b) has one, or two or more polymerizable functional groups.

4. A circularly polarizing plate comprising the broad band cholesteric liquid crystal film according to claim 1.

5. A liner polarizer comprising the circularly polarizing plate according to claim 4 and a λ/4 plate laminated on the circularly polarizing plate.

6. The linear polarizer according to claim 5, wherein the circularly polarizing plate, which comprises the broad band cholesteric liquid crystal film, is laminated on the λ/4 plate so that a pitch length in the film is narrowed toward the λ/4 plate continuously.

7. A linear polarizer comprising an absorption polarizer adhered to the linear polarizer according to claim 5 so that a transmission axis direction of the absorption polarizer and a transmission axis of the linearly polarizer are arranged in parallel with each other.

8. A luminaire comprising the linear polarizer according to claim 5 on a from surface side of a surface light source having a reflective layer on the back surface side thereof.

9. A luminaire comprising the circularly polarizing plate according to claim 4 on a front surface side of a surface light source having a reflective layer on the back surface side thereof.

10. A liquid crystal display comprising a liquid crystal cell in a light emitting side of the luminaire according to claim 9.

11. A polarizing element system comprising: a retardation layer (b) having a front face retardation (in the normal direction) of almost zero and a retardation of λ/8 or more relative to incident light incoming at an angle of 30° or more inclined from the normal direction arranged between at least two reflection polarizer layers having respective selective reflection wavelength bands of polarized light superimposed on each other, wherein each of the reflection polarizers is the circularly polarizing plate according to claim 4.

12. The polarizing element system according to claim 11, wherein a selective reflection wavelength of the at least two layers of the reflection polarizer (a) are superimposed on each other in the wavelength range 550 nm±10 nm.

13. The polarizing element system according to claim 11, wherein the retardation layer (b) is a layer comprising a cholesteric liquid crystal phase having a selective reflection wavelength band other than the visible light region fixed in planar alignment.

14. The polarizing element system according to claim 11, wherein the retardation layer (b) is a layer comprising a rod-like liquid crystal fixed in homeotropic alignment state.

15. The polarizing element system according to claim 11, wherein the retardation layer (b) is a layer comprising a discotic liquid crystal fixed in nematic phase or columnar phase alignment state.

16. The polarizing element system according to claim 11, wherein the retardation layer (b) is a layer comprising a biaxially oriented polymer film.

17. The polarizing element system according to claim 11, wherein the retardation layer (b) is a layer comprising an inorganic layered compound with negative uniaxiality fixed in alignment state where an optical axis thereof is a normal direction of a surface thereof.

18. A wide viewing angle liquid crystal display comprising at least:
   a backlight system containing a polarizing element system according to claim 11 to collimate a light from a diffuse light source;
   a liquid cell transmitting collimated light;
   a polarizing plate arranged on both sides of the liquid crystal cell; and
   a viewing angle magnification film, which diffusing transmitted light, arranged on a viewer side of the liquid cell.

19. The wide viewing angle liquid crystal display according to claim 18, wherein a λ/4 plate is arranged on the viewer side (the liquid crystal cell side) of the polarizing element system so that an axial direction of linearly polarized light transmitted and a transmission axis direction of a polarizing plate on the lower side (the light source side) of the liquid crystal display are arranged in parallel with each other.

20. The wide viewing angle liquid crystal display according to claim 19, wherein the viewing angle magnification film is a diffuse plate substantially having neither backscattering nor polarization cancellation.

21. The wide viewing angle liquid crystal display according to claim 18, wherein the viewing angle magnification film is a diffuse plate substantially having neither backscattering nor polarization cancellation.

22. The wide viewing angle liquid crystal display according to claim 18, wherein an each layer is laminated with a translucent adhesive or a pressure sensitive adhesive.

23. The broad band cholesteric liquid crystal film according to claim 1, wherein the proportion of the polymerizable chiral agent (b) is in the range of from 1 to 20 parts by weight relative to 100 parts by weight of a total amount of a polymerizable mesogen compound (a) and the polymerizable chiral agent (b).

24. A manufacturing method comprising the steps of: coating a liquid crystal mixture containing a polymerizable mesogen compound (a), a polymerizable chiral agent (b) and a photoisomerizable material (c) on a substrate polymerizing by ultraviolet radiation, and forming a cholesteric liquid crystal film having a reflection bandwidth of 400 nm or more and a pitch length that changes continuously, wherein the photopolymerizable material (c) is at least one photoisomerizable material selected from the group consisting of stilbene of structural formula (I) and azobenzene of structural formula (II).

* * * * *